United States Patent [19]

Hagge et al.

[11] 3,710,251

[45] Jan. 9, 1973

[54] MICROELECTRIC HEAT EXCHANGER PEDESTAL

[75] Inventors: John K. Hagge, Kiganjo, Kenya; Frederick W. Johnson, Cedar Rapids, Iowa

[73] Assignee: Collins Radio Company, Dallas, Tex.

[22] Filed: April 7, 1971

[21] Appl. No.: 132,031

[52] U.S. Cl. ....................324/158 F

[51] Int. Cl. ....................G01r 35/00

[58] Field of Search ..........73/15; 324/158 F, 158 P

[56] References Cited

UNITED STATES PATENTS

| | | | |
|---|---|---|---|
| 3,582,282 | 6/1971 | Kampf et al. | 73/150 |
| 2,464,213 | 3/1949 | Cataldo | 73/15 |
| 3,412,333 | 11/1968 | Frick et al. | 324/158 |
| 3,250,115 | 5/1966 | Donnell | 73/17 |
| 3,333,274 | 7/1967 | Forcier | 346/33 |
| 3,270,565 | 9/1966 | Hawley et al. | 73/497 |
| 3,580,065 | 5/1971 | Strittmater et al. | 73/150 |
| 3,408,565 | 10/1968 | Frick et al. | 324/158 |

*Primary Examiner*—Richard C. Queisser
*Assistant Examiner*—Herbert Goldstein
*Attorney*—Warren H. Kintzinger and R. J. Crawford

[57] ABSTRACT

A microelectric wafer or chip vacuum chuck in the form of a heat exchanger pedestal with a heat exchanger pressure vessel at the pedestal top through which hot and cold fluids are selectively pumped in circulation from and return to, respectively, hot and cold remote fluid reservoirs. A plurality of small diameter vacuum tubes pierce the heat exchanger pressure vessel and are brazed at each end to upper and lower plates with the top of the upper plate being the chuck surface with the vacuum tubes providing frequent tension ties between the plates. Dry nitrogen is fed into and through a circumferential passageway about the pedestal to protect wafers and chips with an inert cover atmosphere from oxidation damage at high temperatures or frost damage at low temperatures.

8 Claims, 3 Drawing Figures

Figure 1:
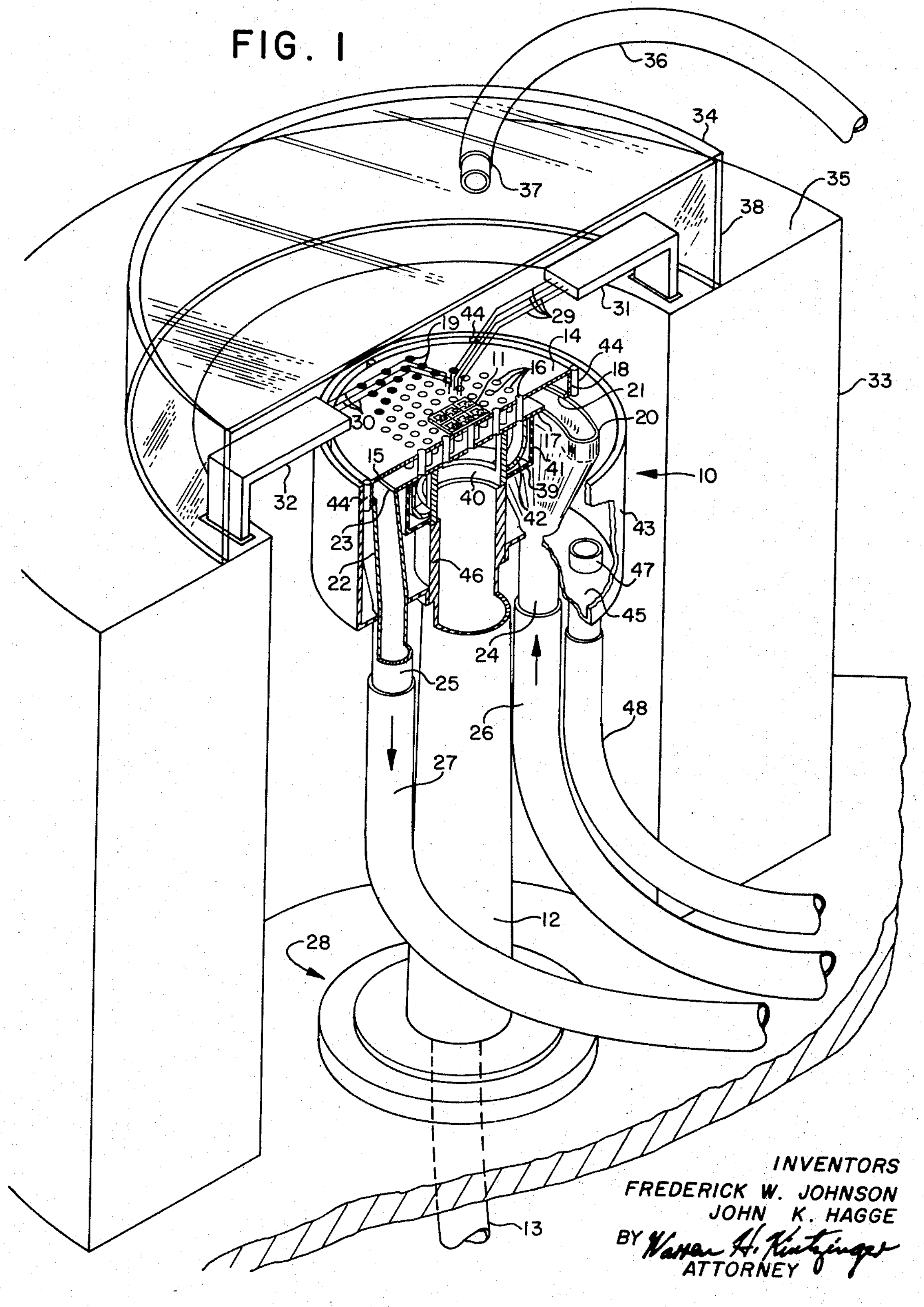

INVENTORS
FREDERICK W. JOHNSON
JOHN K. HAGGE
BY
ATTORNEY

INVENTORS
FREDERICK W. JOHNSON
JOHN K. HAGGE
BY Warren H. Kintzinger
ATTORNEY

INVENTORS
FREDERICK W. JOHNSON
JOHN K. HAGGE
BY Warren H. Kintzinger
ATTORNEY

MICROELECTRIC HEAT EXCHANGER PEDESTAL

This invention relates in general to a microelectronic wafer or chip vacuum chuck and temperature testing of circuit wafers and chips and, in particular, to a small lightweight heat exchanger pedestal, used in place of a vacuum chuck, capable of bringing a wafer or chip, vacuum chucked to the pedestal top, quickly to high or low test temperature and providing an inert cover atmosphere over the wafer or chip during test.

It is important to be able to electrically test microelectronic circuit wafers and chips both at elevated and depressed temperatures and to be able to rapidly cycle between high and low temperatures. Furthermore, it is important that this be accomplished with circuit wafers vacuum chucked to the top of a pedestal with the wafers relatively thin piece of silicon typically about 0.010 inches thick usually 1½ to 2 inches in diameter with a matrix of electrical circuits photoetched into the top surface. Circuit chips on the other hand are typically 0.040 × 0.040 × 0.010 to 0.150 × 0.150 × 0.010 each with an individual circuit obtained by cutting and separating the matrix of circuits on a microelectronic circuit wafer. In testing such microelectronic circuit wafers or chips, tiny 0.001 inch diameter probe wires must be brought into contact with the circuitry on the surface of the wafer or chip. Obviously, this requires alignment of the wafer or chip through high precision positioning and through observation with a microscope with, for example, each circuit on the matrix of circuits on a wafer being probed in testing the microelectronic circuits thereof. While acceptable methods of testing wafers or chips have been available for testing at environmental temperatures, there has been no way heretofore for performing such tests at elevated and depressed temperatures with rapid temperature cycling between the desired temperature limits.

Various existing wafer testers utilize a vacuum chuck mounted on an automatically controlled X–Y table with the vacuum chuck holding the silicon wafer in place while the X–Y table automatically cycles the wafer through the positions of each circuit on the wafer. After the X–Y table is brought into registry for testing each circuit it is raised slightly to bring the particular wafer into contact with the stationary test probes. This is with each wafer having been positioned visually through the microscope before the automatic test sequence is begun, and with this also being the case with individual circuit chips. These alignment requirements have not lent themselves to elevated and depressed temperature wafer testing since, for example, placing the whole test apparatus in an oven or temperature chamber simply is not practical with it being necessary to view the wafer with a microscope for alignment. Still further, presently available automatic X–Y cycling tables are not accurate in location at temperature extremes or simply cannot stand the extreme temperatures required. Approaches such as building electric heaters or thermoelectric coolers into the vacuum chuck that holds the wafer or chip while feasible in some respects require relatively long times to change temperature. Furthermore, with some wafers a fast temperature change testing capability is desired, since with respect to some of these each circuit on a wafer may be probed only once while temperature is varied during continuous electrical test. With such requirements a circuit wafer must be raised and lowered in temperature through at least one of the repetitive temperature variation cycles for each circuit position. Thus, with as many as several hundred circuits in a wafer matrix fast temperature change cycling becomes essential otherwise test time becomes prohibitively long. A further problem with systems giving temperature variations for testing is that circuit wafers or chips at times may be subject to oxidation damage at high temperatures or frost damage at low temperatures.

It is, therefore, a principal object of this invention to provide a testing device mounting circuit wafers or chips in precise orientation and location through cycles of temperature variation to high temperatures and/or low temperatures relative to ambient while testing of wafer circuits or chip circuits is conducted.

Another object is to provide such a temperature varying microelectronic circuit wafer or chip holding device with very rapid wafer or chip temperature raising and lowering capabilities.

A further object is for such a microelectronic circuit wafer or chip temperature varying device to be a vacuum chuck in the form of a pedestal securely holding circuit wafers or chips in precise location and orientation throughout temperature testing thereof.

Still another object is for such a microelectronic circuit wafer and/or chip mounting pedestal to be capable of very rapid cycling between high and low temperatures back and forth as may be required for some circuit testing.

A further object is to provide protection for circuit wafers and/or chips from oxidation damage and/or frost damage with temperature testing on such a pedestal device.

Features of the invention useful in accomplishing the above objects include, in a microelectronic heat exchanger pedestal holding microelectronic circuit wafers and/or chips in precise location and orientation throughout temperature testing, a small lightweight heat exchanger pedestal structure with vacuum chucking of a circuit wafer or chips and equipped with a dry nitrogen delivery system for maintaining an inert cover atmosphere over circuit wafers or chips during test. The heat exchanger pedestal is mounted on an X–Y positioning table and when shifted from position to position for testing is subject to being raised to bring the circuits under test into contact with 0.001 inch diameter wires used to probe the circuit wafers or chips to perform the necessary electrical tests. It is a heat exchanger pedestal structure with alternately a cooling fluid or heated fluid heat exchanger chamber and plumbing with control valving in order that heat transfer fluid at the desired test temperature be pumped through the heat exchanger chamber of the pedestal. Temperature response characteristics of the pedestal are optimized through the maintenance of two remote reservoir supplies of fluid at desired high and low temperatures with the temperature of the pedestal, and circuit wafers or chips chucked thereto, quite rapidly changed by switching from one fluid supply to the other. The circuit wafers and chips are held in intimate contact with the pedestal top by means of vacuum through many small diameter tubes piercing the heat exchanger pedestal. This is with the many small diameter tubes connecting to a vacuum passage below the temperature fluid heat exchanger chamber portion of the structure that has a vacuum passage continuing through the hollow mounting stem of the pedestal structure to connection finally through suitable plumbing to a remote vacuum source. The pedestal is equipped with a nitrogen delivery chamber and a circumferential top passage optimizing the delivery of dry nitrogen in establishing an inert cover atmosphere in protecting circuit wafers or chips from oxidation due to high temperatures or frost damage at low temperatures. Solenoid control valves are provided for switching of fluid from a hot reservoir to a cold reservoir or the reverse and for the pumping of the chosen fluid through the especially designed cavity within the pedestal structure. This accomplishes the temperature changes quite rapidly with temperature response limited only by the response time of the pedestal structure and the circuit wafer or chips and the response time of the plumbing necessary to accomplish the switching between and delivery thereof of the hot and cold fluid supplies. Temperature cycling with such structure has been accomplished from −55°C to +125° C with tested response times to within 5°C of the final temperature after, respectively, 20 seconds cold to hot and 30 seconds hot to cold.

Another feature of significant note is that the horizontal surfaces of the heat exchanger pedestal are made of Kovar, a material closely matched in thermal expansion to silicon wafers and chips. This is significant since if the surface adjacent to the silicon were unmatched in thermal expansion, movement of the silicon relative to the pedestal would occur during temperature cycling. Thus, position alignment would be lost and proper probing simply could not be accomplished. Much of the remainder of the heat exchanger pedestal structure is made of stainless steel for corrosion resistance and maximum strength with minimum volume and minimized mass of metal. The top surface of the heat exchanger is held extremely flat in order to be compatible with vacuum chucking requirements of circuit wafers or chips supported thereon. The pedestal top is also part of, effectively, a small pressure vessel with heat exchanger fluid being pumped therethrough at appreciable pressures. Multitudinous small vacuum tubes extended down from the vacuum chuck top surface of the pedestal with each vacuum tube braised at upper and lower ends to the respective Kovar surfaces help meet in an essential structural requirement. This is with the tubes providing tension ties at relatively closely spaced lateral intervals between the upper and lower surfaces thereby reducing a large flat area that would be subject to bulging from internal pressure vessel fluid pressures to a great number of much stronger smaller areas. Further, the vacuum tubes also act as pin fins in the structure providing good thermal paths for heat conduction between the fluid and the upper surface, and they promote turbulence around the small diameters of the tubes thereby increasing convective film coefficients and aid in convective heat transfer between the fluid and the pedestal. They also help insure that heat exchanger fluid being pumped through the pedestal is distributed more evenly throughout the pedestal and help provide a wafer supported on the pedestal with an essentially isothermal interface surface.

A specific embodiment representing what is presently regarded as the best mode of carrying out the invention is illustrated in the accompanying drawings.

Figure 2:
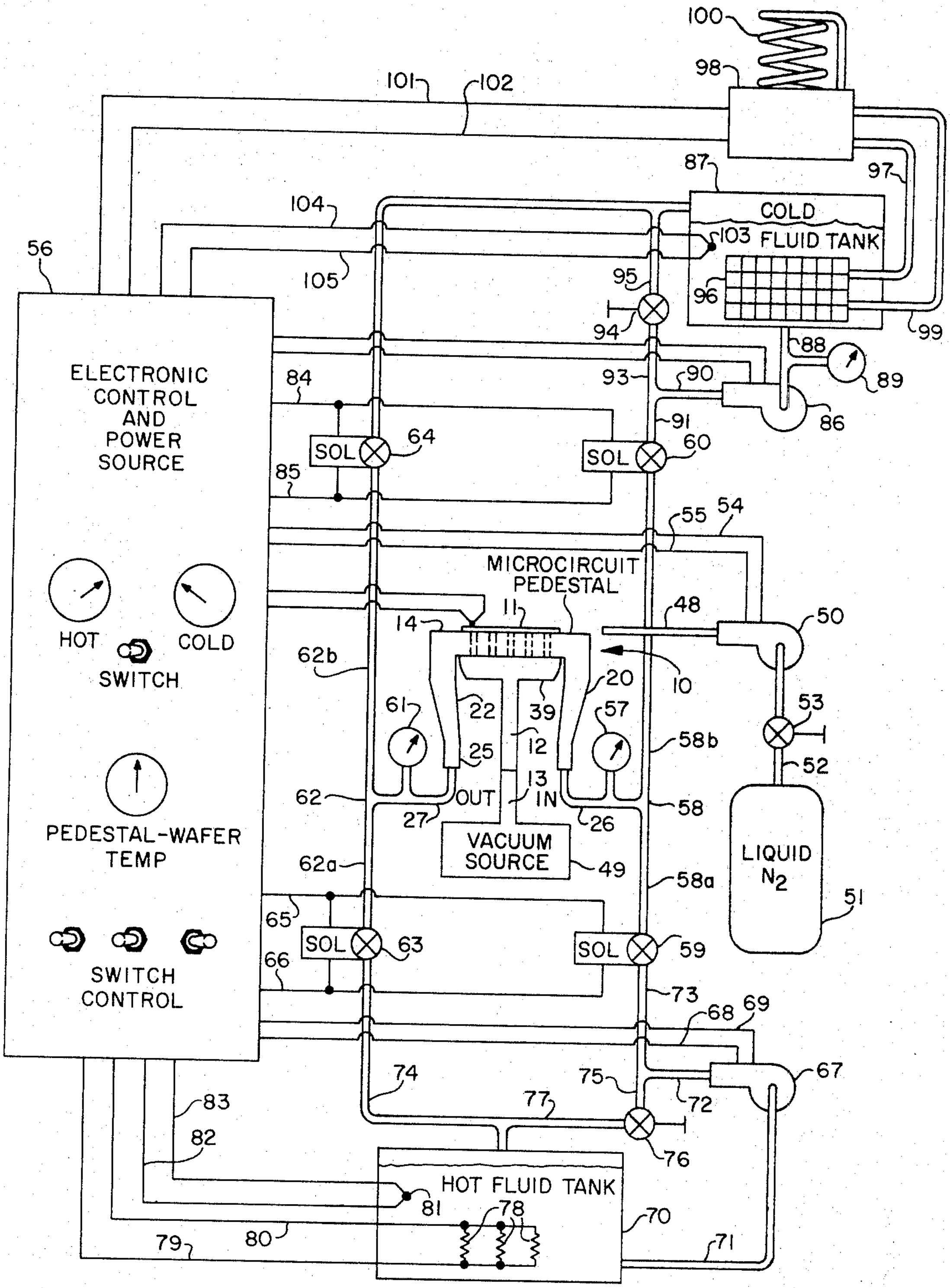
Figure 3:
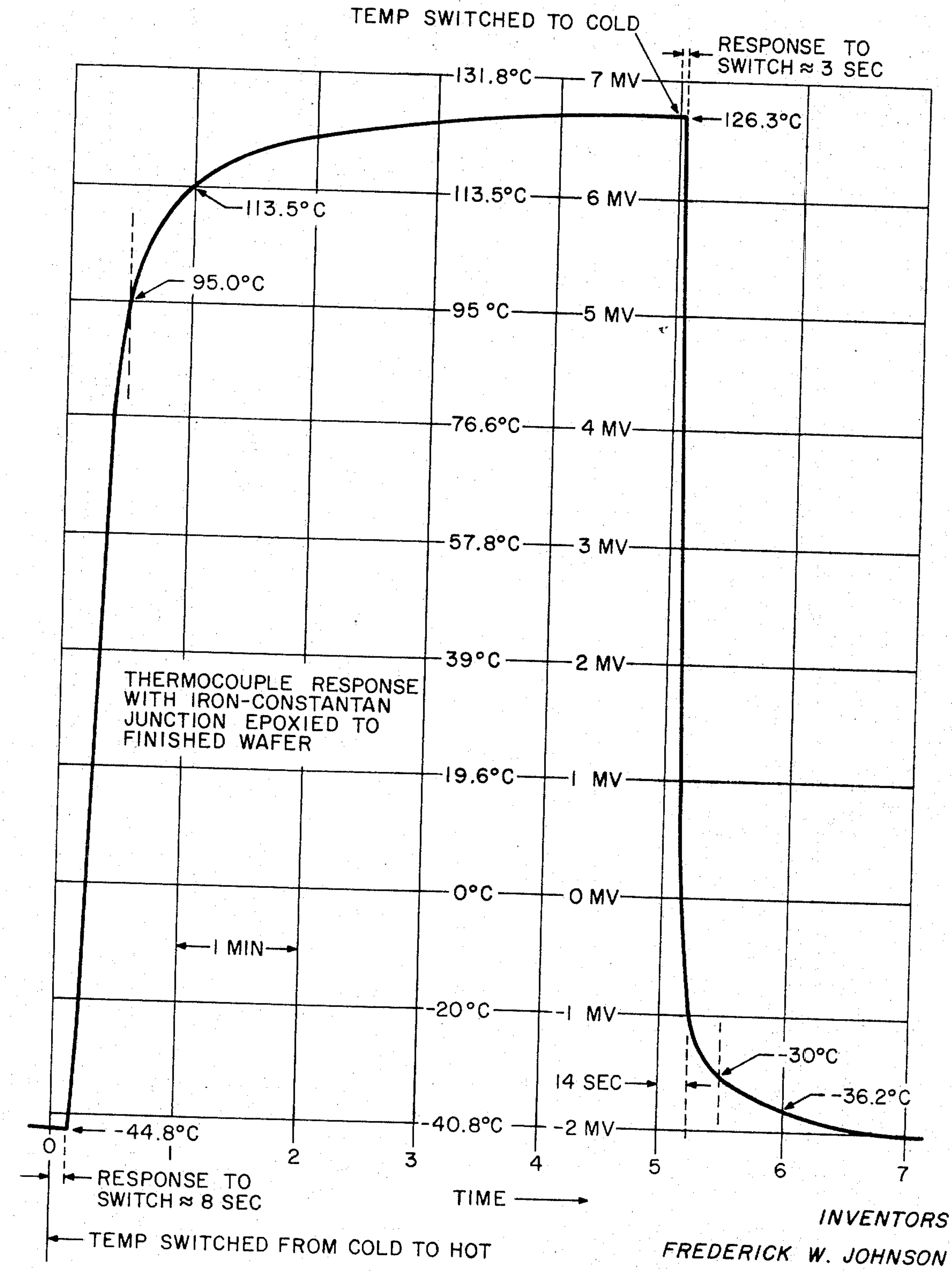

In the drawings:

FIG. 1 represents a partially broken away and detailed perspective view of the heat exchanger pedestal mounted on an X-Y positioning table and supporting a circuit wafer in a test environment to be raised into circuit test engagement with probe wires within an inert atmosphere under a cover;

FIG. 2, a combination fluid plumbing and electronic control system schematic; and FIG. 3, a temperature cycling response to time curve showing the temperature following characteristics of a circuit wafer on the heat exchanger pedestal.

Referring to the drawings:

A microelectronic heat exchanger pedestal 10 in accordance with applicants' teachings is shown in its operational environment as a circuit wafer 11 or chip chucking tool for circuit testing at high and low temperatures and through temperature cycling as desired. This entails use of a pedestal structure 10 with a tubular pedestal mounting stem 12 that is connected through a tubular line 13 to a vacuum source for wafer 11 chucking to the flat top surface 14 of the pedestal 10. The wafer 11, or circuit chip, is held in intimate contact with the top surface 14 of the pedestal top plate 15 by means of vacuum exerted through many small diameter tube pins 16 piercing the heat exchanger pedestal to the interior of a vacuum chamber below plate 17. This plate is part of the heat exchanger pressure vessel formed by the circular upper plate 15 and bottom plate 17 interconnected by a circumferential wall 18, by the tubular pins 16 and also by solid pins 19 through two areas of the heat exchanger pressure vessel structure outside of the circuit wafer and chip vacuum chucking area and other than the inlet and outlet areas thereof. The inlet manifold 20 is connected to opening 21 in the bottom plate 16 and outlet manifold 22 is connected to the outlet opening 23 in bottom plate 17. These input and output manifold structures 20 and 22 that are essentially duplicates one of the other extend from arcuately extended upper open end connections with the openings 21 and 23, respectively, of bottom plate 16 through a transition body portion to tubular lower ends 24 and 25 that are connected to fluid input line 26 and fluid output line 27, respectively.

The tubular mounting stem 12 of the microelectronic heat exchanger pedestal 10 extends to a base mounting structure 28 that is partly an automatically controlled X–Y table with the vacuum chuck at the top surface 14 of the pedestal holding the silicon wafer 11 in place while the X–Y table automatically cycles the wafer through the positions of each circuit on the wafer. Then at each of these positions the X–Y table structure 28 raises the pedestal assembly 10 to bring the wafer 11 into contact with stationary test probe wires 29 and 30. Initially, however, each wafer 11 must be positioned visually through a microscope before this automatic test sequence is begun. This applies also when testing individual circuit chips since each chip must be visually aligned before bringing it into contact with the probe wires 29 and 30. Please note that the probe wires 29 and 30 are connected via connector units 31 and 32 respectively to an annular cylindrical or doughnut shaped electronics package 33 that in spaced radial relation to the heat exchanger pedestal 10 forms a substantial portion of a protective environment enclosure therefor. A transparent inverted nitrogen shroud cup 34 is placed over the top 35 of the cylindrical electronics package 33 and is equipped with a dry nitrogen delivery hose 36 extended through opening 37 in shroud cup wall 38 to aid in maintaining an inert atmosphere over and around the pedestal top during temperature cycling circuit testing of wafers 11 or chips subject to test thereon. Please note again that a fast temperature change capability is desired since different types of circuit wafers may require different test temperatures or both high and low test temperatures and at times temperature cycling when individual wafer circuits are being checked. With some wafers fast temperature change capability is highly desirable where conditions require that each circuit may be probed only once. Such requirements exist when a wafer must be raised and lowered in temperature at each circuit location with this possibly being required hundreds of times for a wafer with several hundred circuits in a wafer matrix. Obviously, this intensifies the requirement for fast temperature change cycling to prevent test times becoming prohibitively long. Thus, it becomes apparent that conventional approaches used heretofore for testing circuit wafers and chips having elevated or depressed temperatures are in conflict with present day testing requirements. For example, placing the whole test setup in an oven or temperature chamber hot or cold is not practical since it is necessary to view the circuit wafer with a microscope for alignment. Furthermore, it is doubtful that presently available automatic X–Y cycling devices could stand the extreme temperatures required.

The vacuum chamber below heat exchanger bottom plate 17 is formed by an annular flexible enclosure member 39 with a radially extended planar portion thereof bonded to the outer circumference of a vacuum chamber center tubular member 40. Tubular member 40 is bonded to the heat exchanger bottom plate 17 as by braising and to the top of the tubular stem 12 also by braising and is equipped with openings for free vacuum communication to the interior thereof and on to the interior of tubular stem 12. The upper end of the cylindrical portion 41 of the vacuum chamber enclosure member 39 is bonded to the bottom plate 17 so as to encompass the entire area range of the tubular members 16 piercing the heat exchanger portion of the pedestal assembly. A rigid spider-like spoked member 42 is provided within the vacuum chamber to prevent vacuum collapse of the flexible member 41 when high vacuum is drawn therewithin. It should be noted that variations from that shown have been constructed with a rigid cup-like member replacing both the vacuum enclosure member 39 and the spider anti-collapse member 42.

An additional chamber structure is provided with the pedestal assembly 10 in the form of a nitrogen chamber 43 enclosing substantially the entire upper pedestal assembly including the heat exchanger portion and the vacuum chamber portion thereof except for the flat vacuum chuck top surface 14 of the pedestal. This is in the form of a dry nitrogen chamber 43 having a cylindrical portion in annular spaced relation to the heat exchanger portion with spacing and mounting pin members 44 supporting the cylindrical portion of the nitrogen chamber 43 in annular spaced relationship from the heat exchanger so that there is a peripheral outlet for the flow of dry nitrogen up over the top surface 14 of the heat exchanger upper plate 15. The nitrogen chamber is enclosed at the bottom by a plate 45 provided with openings for the upper assembly shank 46 of tubular pedestal stem 12, the tubular ends 24 and 25 of the inlet and outlet portions of manifolds 20 and 22, and a nitrogen inlet tube 47 connected to nitrogen supply line 48.

Referring also to FIG. 2, please note that vacuum line 13 extends to a vacuum chamber source 49 and that the nitrogen line 48 extends from the output of a pump 50 supplied with nitrogen from bottle 51 through line 52 including a manually set valve 53 controlling nitrogen vapor flow through line 52. Although not shown the outlet of nitrogen pump 50, as powered through power lines 54 and 55 extended from electronic control and power source 56, would also be connected to nitrogen line 36 although this connection for the delivery of nitrogen to the shroud cover 34 is not shown in FIG. 2. Furthermore, although not shown, nitrogen circulation means from pump 50 could be provided through the cold fluid tank to further insure that the nitrogen supplied to the pedestal 10 is dry nitrogen gas.

The fluid inlet line 26 is connected to a fluid pressure indicating device 57 and extends to a T connection with line 58 with a hot line branch 58a extended to solenoid valve 59 and a cold line branch 58*b* extended to solenoid valve 60. In like manner fluid outlet line 27 is connected to a pressure measuring device 61 and extends to a T connection with line 62 with a hot fluid return line branch 62*a* extended to solenoid valve 63 and a cold fluid return line branch 62*b* extended to solenoid valve 64. When solenoid valves 59 and 63 are simultaneously actuated to quickly open, via control through lines 65 and 66, fluid pump 67, with power supplied thereto through lines 68 and 69, draws preheated fluid from the hot fluid tank reservoir 70 through line 71. This hot fluid is pumped on through line 72 and line 73 and through solenoid valve 59 into the branch line 58*a* and on through line 26 as a hot fluid supply input to the input manifold 20 of the heat exchanger pressure vessel of the pedestal 10. The output fluid from output manifold 22 is passed through line 27 and branch 62*a* of line 62 and on through solenoid valve 63 and line 74 as a return back to the hot fluid tank reservoir 70. Please note that a shunt line system is provided via line 75, manually set valve 76, and line 77 back to connection with line 74 for hot fluid shunt return to the hot fluid tank reservoir 70 in order that a steady low rate flow may be provided through a portion of the input line piping to keep that portion of the piping at a higher temperature. This helps optimize temperature following characteristics of the test pedestal and circuit wafers or chips chucked thereto in following controlled temperature cycling of the system. Obviously, the solenoid valve 59 and the line connection from pump 67 are located much closer to the line 58 connection with line 26 than one may conclude from the proportional showing of FIG. 2 as a combination control wiring schematic and plumbing diagramatic showing of the system. Hot fluid tank reservoir 70 is equipped with heating elements 78, powered through power lines 79 and 80 from electronic control and power source 56, that respond to temperature level responsive control as determined by thermocouple heat sensor 81. Sensor 81 is positioned within the hot fluid tank reservoir 70 with lines 82 and 83 extended to the electronic control and power source 56.

The cold fluid circulation plumbing system for the pedestal 10 has many similarities to the hot fluid circulation system for the pedestal. When solenoid valves 60 and 64 are simultaneously actuated to quickly open, via control through lines 84 and 85 from electronic control and power source 56, fluid pump 86 draws prechilled cold fluid from the cold fluid tank reservoir 87 through line 88 with a connection to a pressure measuring device 89. This cold fluid is pumped on through line 90 and line 91 and through solenoid valve 60 into branch line **58*b* and on through line 26 as a cold fluid supply input to the input manifold 20 of the heat exchanger pressure vessel of the pedestal 10. The cold output fluid return from output manifold 22 is passed through line 27 and branch line 62*b* and on through solenoid valve 64 and line 92 as a return back to the cold fluid tank reservoir 87. Please note that a shunt line system much the same as with the hot fluid system is provided via line 93, manually set valve 94 and line 95 back to connection with line 92 for cold fluid shunt return to the cold fluid tank reservoir 87 in order that a steady low rate flow may be provided through a portion of the cold fluid input line piping to keep that portion of the piping at a lower temperature. Obviously, this helps optimize temperature following characteristics of the test pedestal and circuit wafers or chips chucked thereto in following control temperature cycling of the system just as with the hot fluid portion of the system. Further, the comments with respect to the location of solenoid valve 59 and the shunt line 75 of the hot fluid piping are applicable in like manner to the location of solenoid valve 60 and shunt line 93 in the cold piping with solenoid valve 60 and the start of shunt line 93 located quite close to the line 58 connection with line 26. The cold fluid tank reservoir 57 has cascade type refrigerator system coils 96 located therein with a refrigerant input pipe 97 connected thereto from refrigerator pump and control section 98. A pipe 99 carries refrigerant vapor back from the cooling coil evaporator section 96 of the refrigerant system to the refrigerator motor pump and control box 98, with condensing coil 100 mounted thereon, that is provided with control power through lines 101 and 102 from electronic control and power source 56. Power is supplied through lines 101 and 102 from the electronic control and power source 56 to the refrigerant motor and power control system 98 in response to temperature variation sensed by thermocouple sensor 103 positioned within the fluid of the cold fluid tank and connected through lines 104 and 105 to the electronic control and power source 56. This provides for automatic cold level sense control of the refrigerant system for automatic maintenance of the coolness of the cold fluid within the cold fluid tank reservoir 87. Please note that with respect to both the cold fluid tank reservoir 87 and the hot fluid tank reservoir 70 each is of adequate capacity. When one is called upon to supply fluid to the pedestal 10 as opposed to the other there is not a sudden change in temperature of the overall hot or cold supply and that the cooling system or the heating system respectively are adequate to maintain low and high temperatures desired. Furthermore a control from electronic control and power source 56 for actuating solenoid valves and deactivating other solenoid valves occurs practically simultaneously so there is a very quick switch from use of one fluid to the other so, as a general rule, only one fluid either the cold or the hot fluid is used as the fluid circulation supplied to the pedestal at any one moment in time. Furthermore temperature sensors such as thermocouples could be located in other locations such as, for example, out of the cold pump 86, on a fin of the cold exchanger of the refrigerant system 96, and at a position on the outlet manifold 22** for temperature sensing fluid leaving the pedestal; and with a nitrogen circulation system with a loop through the refrigerant system (not shown) a nitrogen temperature thermocouple could be located where nitrogen leaves the cold exchanger of such a system. These, of course, are all additional sensing and perhaps control locations for temperatures at various locations in the system in addition to those shown in FIG. 2.

Thus a circuit wafer or chip chucking pedestal and temperature control system is provided with heat transfer fluid at the desired test temperature pumped through the pedestal. This is with two remote supplies of fluid at high and low temperatures, respectively, being employed to make it possible to change the temperature of circuit wafers or chips being tested quite rapidly by switching from one fluid flow supply to the other. Liquids used in the system include, for example, Three M Company fluid products FC–40 and/or FC–77 that are fluorochemical liquids with the trade name Fluorinert. Either of these liquids may be used or a mix thereof. The wafer 11 subject to temperature circuit testing is held in intimate contact with the top of the pedestal 10 by means of vacuum through the many small diameter tubes 16 piercing the heat exchanger pedestal. This is with the vacuum passage continuing below the pedestal through the mounting stem and finally to a remote vacuum source. Dry nitrogen is bled into a passageway around the circumference of the pedestal to protect the wafer with an inert cover atmosphere from oxidization damage at high temperatures or frost damage at low temperatures. Actual units have been tested from −55°C to +125°C with tested response times to within 5°C of final temperature being 20 seconds cold to hot and 30 seconds hot to cold. This is with the desired test temperatures achieved by pumping heat transfer fluid through the specially designed cavities within the pedestal. Through the convenient expediency of having available both hot and cold fluid supplies it is readily possible to change the test temperature of a circuit wafer or chip subject to test simply by switching to the other fluid supply. This accomplishes temperature change quite rapidly with the temperature response limited only by the response time of the pedestal and wafer with these response time characteristics such as illustrated with the temperature to time response characteristics curve of FIG. 3 illustrating response sensed by a thermocouple junction epoxyed to a circuit wafer subject to test. FIG. 3 shows response characteristics to time in switching from cold to hot and subsequently response to time in switching from hot to cold.

An important feature is that the horizontal plate members of the heat exchanger pedestal in other words heat exchanger plates 15 and 17 are made of a substance such as Kovar that is matched in thermo expansion to silicon circuit wafers and chips subject to test. Should a surface adjacent to a silicon wafer be unmatched in thermo expansion movement of the silicon relative to the pedestal would occur over the temperature cycling. This would result in position alignment loss and proper circuit probing just could not be accomplished. Much of the remainder of the heat exchanger pedestal is made of stainless steel for corrosion resistance and maximum strength with minimum volume of metal. This is with the pedestal designed for optimized response in following temperature changes in temperature cycling and with the theoretical response time for this type of heat transfer problem being directly proportional to convective fin coefficient and surface area between pedestal and fluid and inversely proportion to the volume of metal contained in the pedestal. As a result considerable effort has been directed to maximizing film coefficients and surface areas and simultaneously minimizing metallic volume in the structure. The vacuum tubes piercing the heat exchanger pressure vessel also act as pin fins promoting turbulence and even flow distribution and as a result improving fluid film coefficients. The tubes also provide additional surface area in contact with the fluid. Thin wall elements are used throughout the structure of the pedestal for best geometric distribution of mass with wall thicknesses typically 0.010 to 0.025 inches thick. Finally, the wafer is kept in extremely good thermo contact with the pedestal by use of the vacuum chuck in maintaining intimate contact through a relatively large area extremely flat interface between the two. It should be noted further that the top surface of the heat exchanger is held extremely flat to be compatible with this vacuum chucking of circuit wafers even though the heat exchanger portion of the pedestal is a small pressure vessel with fluid being pumped through it at appreciable pressures. Large flat sections of the pressure vessel heat exchanger would be particularly weak with this problem being overcome by the vacuum tubes piercing the heat exchanger providing structural tension points at many locations across the flat section of the heat exchanger. Each of these tubes piercing the heat exchanger is braised at each end to the Kovar material upper and lower plates thereby providing tension ties between the upper and lower plates to in effect reduce what would otherwise be a large flat area to a great number of much stronger smaller areas.

Whereas this invention is here illustrated and described with respect to a single embodiment hereof, it should be realized that various changes may be made without departing from essential contributions to the art made by the teachings hereof.

We claim:

1. A support pedestal for testing microelectronic devices comprising:

a. a heat exchange chamber having upper and lower plates, inlet and outlet manifolds positioned near opposite periphery regions of said lower plate for circulating temperature controlling fluids through said chamber, and a plurality of vacuum tubes extending through said chamber and said upper and lower plates, b. temperature control means including fluid reservoir means and fluid circulation means interconnecting said reservoir means to said inlet and outlet manifolds;

c. vacuum chuck means for chucking devices subject to test to the upper surface of said upper plate including a vacuum chamber beneath said heat exchange chamber in vacuum communication with said plurality of vacuum tubes, and vacuum source means connected through vacuum communication means with said vacuum chamber;

d. inert gas delivery means circumscribing said heat exchange chamber for providing an inert atmosphere over devices while subject to temperature testing;

e. probe means including probes positioned above said heat exchange chamber for engaging microelectronic devices during test, and structural support means positioned around said gas delivery means and supporting said probes;

f. positioning means for bringing microelectronic devices being tested into test engagement with said probe means; and g. an inverted shroud cup on said structural support means and cooperatively enclosing devices chucked to said upper plate and with said gas delivery means facilitating said inert atmosphere.

2. The support pedestal of claim 1, wherein said fluid reservoir means includes, a cold fluid reservoir; a hot fluid reservoir; and said fluid circulation means includes cold fluid line connection means; and hot fluid line means; and fluid line valve means for switching circulation of fluid to said heat exchanger chamber from one of said reservoirs to the other of said reservoirs.

3. The support pedestal of claim 2, wherein said fluid line valve means includes solenoid control valves for fast controlled switching between hot and cold fluid flows to said heat exchanger chamber.

4. The support pedestal of claim 3, wherein said valve means for switching circulation of fluid to said heat exchanger chamber from one of said reservoirs to the other includes: a first solenoid valve in an inlet line from the hot reservoir, and a second solenoid valve in a return line to the hot reservoir; and a third solenoid valve in an inlet line from the cold reservoir, and a fourth solenoid valve in a return line to the cold reservoir.

5. The support pedestal of claim 4, wherein electronic control means is provided for controlled simultaneous switch control of said solenoid valves in switching fluid circulation from one fluid reservoir to the other reservoir.

6. The support pedestal of claim 1, wherein said positioning means is an X–Y positioning table.

7. The support pedestal of claim 1, wherein a dry nitrogen gas line is connected to said inverted shroud cup from a nitrogen supply to help insure an inert atmosphere about devices subject to temperature testing on said pedestal.

8. The support pedestal of claim 1, wherein said vacuum communication means includes, a tubular pedestal stem, and line means connected to said vacuum source means.

* * * * *